(12) United States Patent
Fiedler

(10) Patent No.: US 7,807,304 B2
(45) Date of Patent: Oct. 5, 2010

(54) ZINC AIR BATTERY

(75) Inventor: Dirk Arno Fiedler, Dee Why (AU)

(73) Assignee: Cochlear Limited, Lane Cove (AU)

( * ) Notice: Subject to any disclaimer, the term of this patent is extended or adjusted under 35 U.S.C. 154(b) by 1381 days.

(21) Appl. No.: 10/526,967

(22) PCT Filed: Sep. 5, 2003

(86) PCT No.: PCT/AU03/01165

§ 371 (c)(1), (2), (4) Date: Sep. 19, 2005

(87) PCT Pub. No.: WO2004/023585

PCT Pub. Date: Mar. 18, 2004

(65) Prior Publication Data

US 2006/0147775 A1   Jul. 6, 2006

(30) Foreign Application Priority Data

Sep. 6, 2002   (AU) .............................. 2002951260

(51) Int. Cl.
*H01M 12/00* (2006.01)
*H01M 2/02* (2006.01)
*H01M 2/04* (2006.01)

(52) U.S. Cl. ...................... 429/405; 429/406; 429/407; 429/163; 429/164; 429/177

(58) Field of Classification Search ...................... None
See application file for complete search history.

(56) References Cited

U.S. PATENT DOCUMENTS

| 5,569,551 | A | 10/1996 | Pedicini et al. |
| 5,639,568 | A | 6/1997 | Pedicini et al. |
| 6,248,476 | B1 | 6/2001 | Sun et al. |
| 6,332,899 | B1 | 12/2001 | Pong |
| 6,602,629 | B1 * | 8/2003 | Guo et al. ...................... 429/27 |
| 2001/0009735 | A1 | 7/2001 | Yang et al. |

FOREIGN PATENT DOCUMENTS

| EP | 0700110 | 3/1996 |
| WO | WO 01/91224 A1 | 11/2001 |

OTHER PUBLICATIONS

Supplementary European Search Report dated Oct. 15, 2008.

* cited by examiner

*Primary Examiner*—Jonathan Crepeau
(74) *Attorney, Agent, or Firm*—Kilpatrick Stockton LLP

(57) ABSTRACT

A zinc air-type battery comprising first and second cathodes each with positive contacts and an anode with a negative contact. The second cathode is situated proximal to the negative contact and proximal to the anode, which can enable air ingress to be substantially doubled and the internal resistance of the battery to be substantially halved, and further can provide for a relatively short diffusion length of ions from the second cathode.

33 Claims, 5 Drawing Sheets

ZINC AIR BATTERY

CROSS-REFERENCE TO RELATED APPLICATIONS

This application claims the priority of and is a national stage application of PCT Application No. PCT/AU2003/001165, entitled, "Zinc Air Battery," filed on Sep. 5, 2003, which claims the priority of Australian Patent No. 2002951260, filed on Sep. 5, 2002. The entire disclosure and contents of the above applications are hereby incorporated by reference.

FIELD OF THE INVENTION

The present invention relates to zinc air batteries and other such batteries which use oxygen as a reactant.

DESCRIPTION OF THE PRIOR ART

Zinc air batteries have recently been gaining popularity in applications in which the battery capacity will be consumed within a relatively long period of time, such as a few weeks. It has been found that zinc-air batteries will typically give the longest service of any common battery system, due in the main to their high energy density.

The cathode of a zinc-air cell is a catalysed porous carbon electrode which is positively charged and contains water molecules. Under load, when air comes into contact with the cathode, oxygen from the air is reduced to produce hydroxide ions. At least one hole in the battery container allows oxygen from the air to enter the cathode and be reduced on the carbon surface. The air must have an unobstructed path through the device and into the cathode so that the oxygen in the air is available to discharge the cathode. Because excessive moisture can degrade battery performance, the container hole is sealed by an adhesive backed tab prior to consumer use. This tab must be removed before the battery is put into service.

The hydroxide ions produced by the cathode migrate through a separator to the anode. The separator prevents migration of solid particles and short circuiting between the cathode and anode.

The anode of the zinc air cell is a gelled mixture of zinc powder, conductive, gelifying and adhesive additives and electrolyte. Under load, as the hydroxide ions enter the anode, the zinc in the anode is oxidised, as occurs in a miniature mercuric oxide or silver oxide battery. The electrolyte of the cell is a highly conductive solution of KOH in water. The electrode reactions for a zinc air battery are as follows:

  (1)

  (2a)

  (2b)

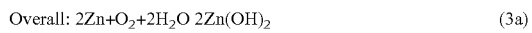  (3a)

  (3b)

The voltage resulting from this reaction is theoretically maximally 1.65V, but varies towards lower values with current drawn from the battery, with depth of discharge, and with the distribution between direct formation of either zinc hydroxide (eq. 2a) or zinc oxide (eq. 2b). At discharge power levels of around 1-2 mW, zinc air "button" cells exhibit a high discharge capacity. However, while zinc air button cells are capable of supplying continuous power levels of up to about 20 mW of power while maintaining an acceptable voltage level of above 0.9V, at such high discharge power levels, the available discharge capacity of such cells is significantly reduced when compared to that at discharge power levels of 1-2 mW.

There exist systems which are size-sensitive and require the use of button cells such as zinc air cells, and yet draw an operating power greater than 1-2 mW. For example, small sound processors of cochlear implants usually draw at least 10-30 mW, often have constant periods of operation of 30-50 mW, and have peak power levels of up to 50-90 mW at a voltage of about 3V. In this context, this requires use of three zinc air cells connected in series to meet the power needs of the system. When used in systems drawing such power levels, two factors become significant when considering the available service time of such batteries. One such factor is the amount of oxygen which can be consumed at the positive oxygen electrode. The kinetics of this electrode limit the amount of oxygen which can be converted during a given period of time. One known solution to this problem is to apply larger air access holes to the battery container. Another solution is to tailor the catalyst contained in this positive oxygen electrode in order to maximise the kinetics of the oxygen reduction reaction.

Another such factor is that the internal resistance of the zinc air battery becomes a significant factor at such power levels, causing a drop in the output voltage of the battery such that the output voltage level of the battery falls below an acceptable operating level well before the discharge capacity of the battery has been fully utilised. Known solutions to this particular problem were the amalgamation of the zinc electrode. However this method is no longer used due to environmental concerns, and other metals are used instead, such as indium or gallium.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect, the present invention provides a battery comprising:

a first cathode operable to electrochemically reduce oxygen to produce hydroxide ions;

a first positive contact electrically connected to the first cathode to allow electrons to flow to the cathode;

means to allow air into the battery to provide oxygen for reduction at the first cathode;

an anode operable to receive hydroxide ions and undergo oxidation to produce electrons;

a negative contact electrically connected to the anode to allow electrons to flow from the anode; and a first separator between the first cathode and the anode;

wherein the battery further comprises a second cathode operable to electrochemically reduce oxygen to produce hydroxide ions, the second cathode being electrically connected to a second positive contact which allows electrons to flow to the second cathode, wherein the second cathode is situated proximal to the negative contact and proximal to the anode, wherein the battery comprises means to allow air into the battery to provide oxygen for reduction at the second cathode, and wherein the battery comprises a second separator between the second cathode and the anode.

By providing a second cathode, the present invention enables air ingress to be substantially doubled and the internal resistance of the battery to be substantially halved. Where the battery is used in systems which draw relatively high levels of current, an increased air ingress and a reduced internal resistance of the battery enable internal losses to be reduced, and reduces an internal voltage drop, thus enabling operation to continue closer to the true capacity limit of the battery at an acceptable output voltage level. Further, by providing a cathode proximal to the negative contact of the battery, the diffusion length of ions from that cathode are relatively short, which in some battery configurations can effectively halve the average ion diffusion length of the battery as a whole.

The battery is preferably a button battery. The first and second cathodes preferably comprise catalysed carbon, while the anode preferably comprises zinc, which may be provided in a gelled mixture of zinc powder and KOH electrolyte.

In embodiments in which the battery is a button battery, the battery casing is preferably formed by the first positive contact and the negative contact together with an insulating gasket. The negative contact may comprise the lid of the battery casing, side portions of the lid being positioned within a can defined by the first positive contact, the first positive contact and the negative contact being electrically insulated from each other by the gasket lining the inside of the can. Further, the second positive contact to which the second cathode is connected is preferably situated within the battery casing, extending from the first cathode to the second cathode and being insulated from the anode and the negative lid.

In such embodiments the means to allow air into the battery to provide oxygen for reduction at the first cathode preferably comprises at least one hole through the base of the positive can. An air distribution membrane is preferably provided across the at least one hole to assist even distribution of air and to prevent entry of solid particles through the at least one hole. Similarly, in a button battery in accordance with the present invention, the means to allow air into the battery to provide oxygen for reduction at the second cathode preferably comprises at least one hole in the negative contact lid of the button battery, to allow airflow through the hole to the second cathode. Again, an air distribution membrane is preferably provided across the at least one hole in the negative contact lid to assist even distribution of air and to prevent entry of solid particles through the at least one hole in the negative contact lid.

The battery preferably comprises means to prevent entry of air carrying oxygen into the battery to either of the first or second cathodes, prior to commencement of use of the battery. For example, adhesive tabs may be placed over the lid of the battery casing and over the base of the battery casing, in order to seal the battery casing, to prevent entry of moisture and other atmospheric components which may degrade the battery prior to commencement of use of the battery. In one embodiment, adhesive metal-polymer laminates are used in order to effectively block out oxygen and/or water diffusion through these tabs, during, for example, storage of the battery.

The first and second separators preferably serve to prevent migration of solid particles between the first and second cathodes and the anode, and to avoid formation of electrical short circuits.

In an alternate embodiment, the button battery may comprise two positive lids joined by a crimp seal on both facing sides of the button cell via electrically insulating grommets to a negative ring.

In addition, embodiments of the present invention may comprise an electrically conductive yet electrochemically inactive backbone of an electrode. The purpose of such a backbone is to decrease the cell impedance, particularly towards the end of the discharge and/or at high loads in order to optimally use the available discharge capacity of such a cell, which is given by the total amount of reducible zinc contained in the anode. The backbone may comprise metal or metal-coated particles or alloys or alloy-coated particles of any suitable material and of any suitable shape. The metal may comprise copper, or a typical alloy would be brass. Typical particle shapes include granules, flakes, or fibres, while typical particle materials may include metals, polymers resistant to the electrolyte solution in use, or inorganic materials such as silicon dioxide or titanium dioxide.

According to a second aspect, the present invention provides a method of battery construction comprising the steps of:

providing a first cathode operable to electrochemically reduce oxygen to produce hydroxide ions;

electrically connecting a first positive contact to the first cathode to allow electrons to flow to the cathode;

providing means to allow air into the battery to provide oxygen for reduction at the first cathode;

providing an anode operable to receive hydroxide ions and undergo oxidation to produce electrons;

electrically connecting a negative contact to the anode to allow electrons to flow from the anode;

providing a first separator between the first cathode and the anode;

providing a second cathode operable to electrochemically reduce oxygen to produce hydroxide ions, such that the second cathode is situated proximal to the negative contact and proximal to the anode;

providing means to allow air into the battery to provide oxygen for reduction at the second cathode;

electrically connecting a second positive contact to the second cathode which allows electrons to flow to the second cathode; and providing a second separator between the second cathode and the anode.

The first and second cathodes preferably comprise catalysed carbon, while the anode preferably comprises zinc, which may be provided in a gelled mixture of zinc powder and KOH electrolyte.

The battery is preferably a button battery. In such embodiments, the method of the present invention preferably further comprises forming a casing of the battery from the negative contact and the first positive contact by joining the positive contact and the negative contact together with an insulating gasket. Such embodiments may further comprise the step of electrically connecting the second positive contact to the first cathode within the casing and insulating the second positive contact from the anode and from the negative contact.

In such embodiments of the invention, the step of providing means to allow air into the battery to provide oxygen for reduction at the first cathode preferably comprises providing at least one hole through the first positive contact. Such embodiments of the invention preferably further comprise the step of providing an air distribution membrane across the at least one hole to assist even distribution of air and to prevent entry of solid particles through the at least one hole. Similarly, in such embodiments of the invention, the step of providing means to allow air into the battery to provide oxygen for reduction at the second cathode preferably comprises forming at least one hole in the negative contact of the button battery to allow airflow to the second cathode. Such embodiments of the invention preferably further comprise the step of providing an air distribution membrane across the at least one hole in the negative contact to assist even distribution of air and to prevent entry of solid particles through the at least one hole in the negative contact lid.

Embodiments of the second aspect of the invention preferably further comprise the step of providing means to prevent entry of air carrying oxygen into the battery to either of the first or second cathodes, prior to commencement of use of the battery.

In alternative embodiments of the invention in which the battery is a button battery, the method of the present invention may comprise the step of forming a casing of the button battery from the first positive contact, the second positive contact and the negative contact, by forming the negative contact as a ring, positioning the first and second positive contacts on opposed sides of the ring, and joining the positive contacts to the ring by a crimp seal with electrically insulating grommets.

The method of the second aspect of the present invention may further comprise providing an electrically conductive yet electrochemically inactive backbone of an electrode to decrease cell impedance.

BRIEF DESCRIPTION OF THE DRAWINGS

Examples of the invention will now be described with reference to the accompanying drawings in which.

DETAILED DESCRIPTION OF THE PREFERRED EMBODIMENTS

Figure 1:
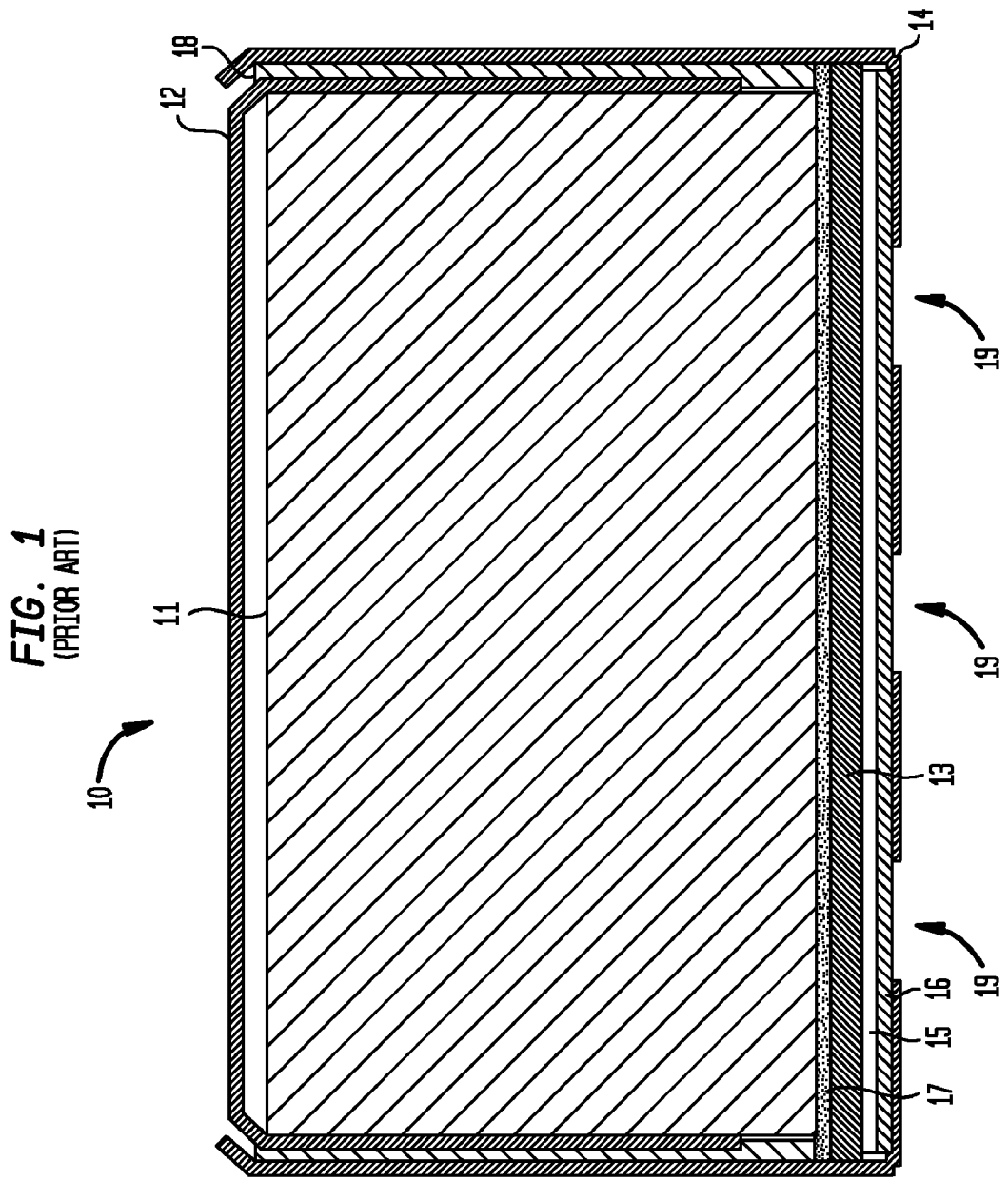
FIG. 1 is a cross-sectional view of a prior art button battery.

FIG. 1 is a cross sectional view of a prior art button battery 10. The battery 10 comprises an anode 11 consisting of a gelled mixture of zinc powder and KOH electrolyte. A negative contact 12, which also serves as a lid of the battery casing, passes electrons from the anode to an external circuit during operation of the battery 10.

A first cathode 13 is provided proximal to a base of the battery 10, and comprises catalysed carbon. A positive contact 14, which also serves as a can of the casing of the battery 10, conducts electrons to the cathode 13 during operation of the battery. Positive contact 14 is electrically insulated from negative contact 12 by gasket 18. Holes 19 are formed in the base of the positive casing 14 in order to allow air into cavity 15 via air distribution membrane 16. During operation of the battery, oxygen from the air in cavity 15 is reduced in a reaction with the carbon cathode 13 and with moisture to form hydroxide ions, as follows:

$$O_2 + 2H_2O + 4e^- \rightarrow 4OH^-.$$

This reaction theoretically generates +0.401V, according to the Standard emf Series.

The hydroxide ions migrate through separator 17 into anode 11, where they react with the zinc as follows:

$$Zn + 2OH^- \rightarrow ZnO + H_2O + 2e^-$$

This reaction theoretically generates +0.763V, according to the Standard emf Series. Hence, the theoretical voltage provided by such a battery is 1.164V.

Alternatively, the following reaction may occur in a strongly alkaline electrolyte solution:

$$Zn + 2OH^- \rightarrow Zn(OH)_2 + 2e^-$$

This reaction theoretically generates +1.250 V, according to the Standard emf Series. Hence, the theoretical voltage provided by such a battery is 1.651 V. However, the actual voltage provided by such a battery reduces as larger values of power are drawn from the battery, and falls depending on the depth of discharge of the battery. Such a cell is capable of supplying perhaps 20 mW at above 0.9V, however the available discharge capacity is significantly reduced at such operating levels. One of the limiting factors in this regard is the amount of oxygen available for consumption at the electrode 13. Another limiting factor is the internal resistance which causes a significant internal voltage drop at such current levels.

Figure 2:
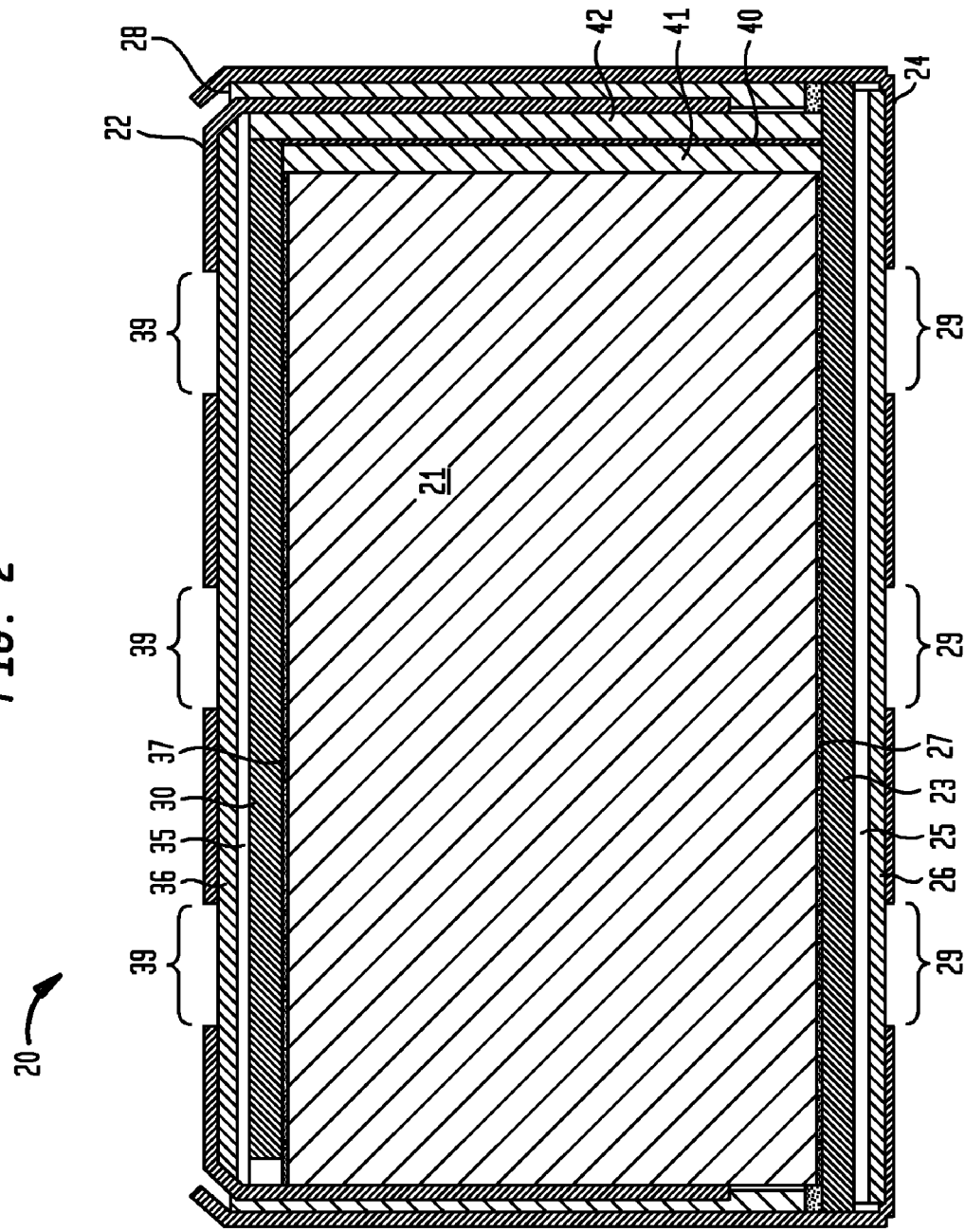
FIG. 2 is a cross sectional view of one embodiment of a button battery in accordance with the present invention.

FIG. 2 illustrates a zinc air battery 20 in accordance with the present invention. The battery 20 comprises an anode 21 consisting of a gelled mixture of zinc powder and KOH electrolyte. A negative contact 22, which also serves as a lid of the battery casing, passes electrons from the anode to an external circuit during operation of the battery 20.

A first cathode 23 is provided proximal to a base of the battery 20, and comprises porous activated carbon with a very high surface area, and comprising a catalyst applied by, for example, drenching the carbon in a catalyst solution. A positive contact 24, which also serves as a can of the casing of the battery 20, conducts electrons to the cathode 23 during operation of the battery. Positive contact 24 is electrically insulated from negative contact 22 by gasket 28. Holes 29 are formed in the base of the casing 24 in order to allow air into layer 25 via air distribution membrane 26. In the present embodiment, layer 25 is hydrophobic, and may be made from, for example, Teflon® and encourages an even supply of oxygen to the carbon electrode 23. The distribution membrane 26 comprises a non-woven material such as felt, made from, for example, nylon or a polyolefine such as polyethylene or polypropylene. Hydroxide ions produced at the cathode 23 migrate through separator 27 into anode 21.

In accordance with the present invention, the battery 20 further comprises a second cathode 30 positioned proximal to the anode 21 and proximal to the negative contact 22. Holes 39 are formed in the negative lid 22 in order to allow air into hydrophobic layer 35 via air distribution membrane 36. During operation of the battery, oxygen from the air in layer 35 is reduced in a reaction with the carbon cathode 30 and with moisture to form hydroxide ions, as follows:

$$O_2 + 2H_2O + 4e^- \rightarrow 4OH^-.$$

The electrons of cathode 30 involved in this reaction are provided by conductor 40 which electrically connects the first cathode 23 with the second cathode 30. The conductor 40 is insulated from the anode 21 by insulator 41, and is insulated from the negative lid 22 by insulator 42.

The hydroxide ions from the second cathode 30 migrate through the separator 37 into anode 21, where they react with the zinc as follows:

$$Zn + 2OH^- \rightarrow ZnO + H_2O + 2e^-$$

By providing the second cathode 30, the present invention enables an internal resistance of the battery 20 to be substantially halved. Where the battery is used in systems which draw relatively high levels of power, such a reduced internal resistance of the battery enables internal losses to be reduced, and reduces an internal voltage drop, enabling operation to continue closer to the true capacity limit of the battery at an acceptable output voltage level. Further, by providing the cathode 30 proximal to the negative contact 22 of the battery, the diffusion length of ions from cathode 30 are relatively short, which in the battery configuration shown can effectively halve the average ion diffusion length of the battery 20 as a whole.

Figure 3:
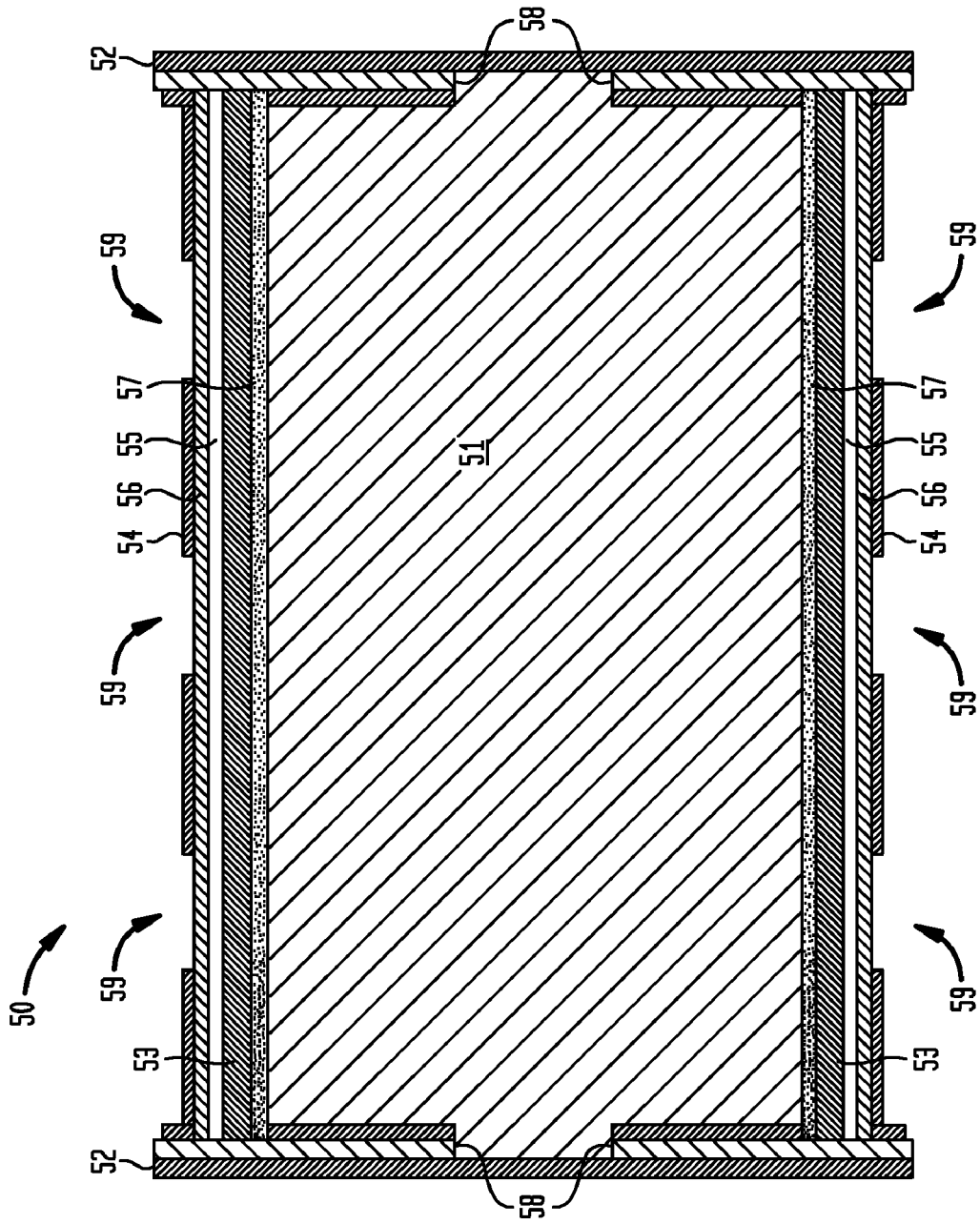
FIG. 3 is a cross sectional view of a second embodiment of a button battery in accordance with the present invention.

FIG. 3 is a cross sectional view of a second embodiment of a button battery 50 in accordance with the present invention. The battery 50 comprises an anode 51 consisting of a gelled mixture of zinc powder and KOH electrolyte. A negative contact 52, which also serves as a can of the battery casing, passes electrons from the anode to an external circuit during operation of the battery 50.

Cathodes 53 are provided at both ends of the substantially cylindrical battery, each comprising catalysed carbon. Positive contacts 54, which also serve as lids of the casing of the battery 50, conduct electrons to the cathodes 53 during operation of the battery. Positive contacts 54 are electrically insulated from negative contact 52 and from anode 51 by gaskets 58. Holes 59 are formed in both lids 54 in order to allow air into hydrophobic layers 55 via air distribution membrane 56. Hydroxide ions produced at the cathodes 53 migrate through separators 57 into anode 51.

As can be seen, the embodiment of the invention illustrated in FIG. 3 provides a negative contact around the lateral exterior of the substantially cylindrical battery, with two positive contacts, one at each end of the substantially cylindrical battery.

By providing two cathodes 53, the illustrated embodiment of the present invention again enables an internal resistance of the battery 50 to be substantially halved. Where the battery is used in systems which draw relatively high levels of power, such a reduced internal resistance of the battery enables internal losses to be reduced, and reduces an internal voltage drop, enabling operation to continue closer to the true capacity limit of the battery at an acceptable output voltage level.

Another advantage of the particular embodiment shown in FIG. 3 is that the insertion of such a battery into a device to be powered by it is no longer sensitive to its geometry, because of the symmetry of the design. Devices which use contact springs to contact both facing sides of a button cell will not work with this embodiment, however, they will not be damaged either, as can otherwise occur because of reversed polarity.

Figure 4A:
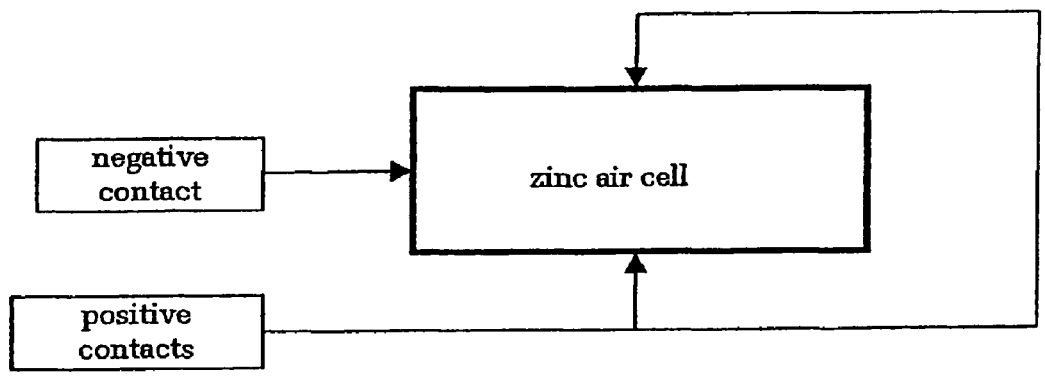
FIGS. 4a, 4b and 4c are contact schematics for the one-cell, two-cell and N-cell arrangement of the embodiment depicted in FIG. 3.
Figure 4B:
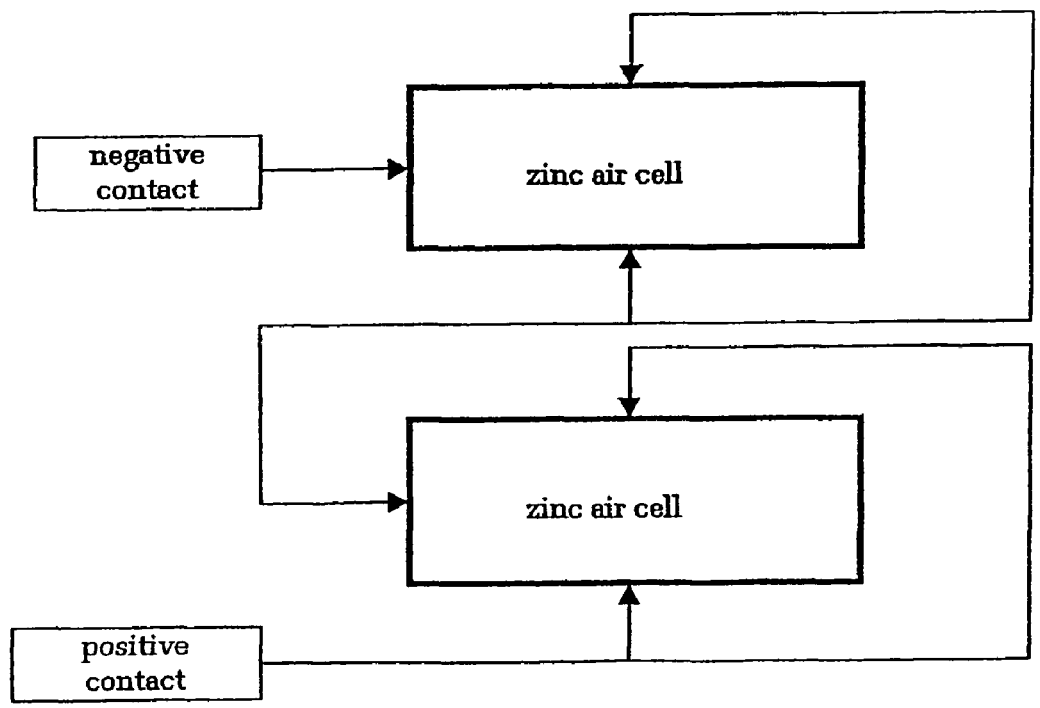
Figure 4C:
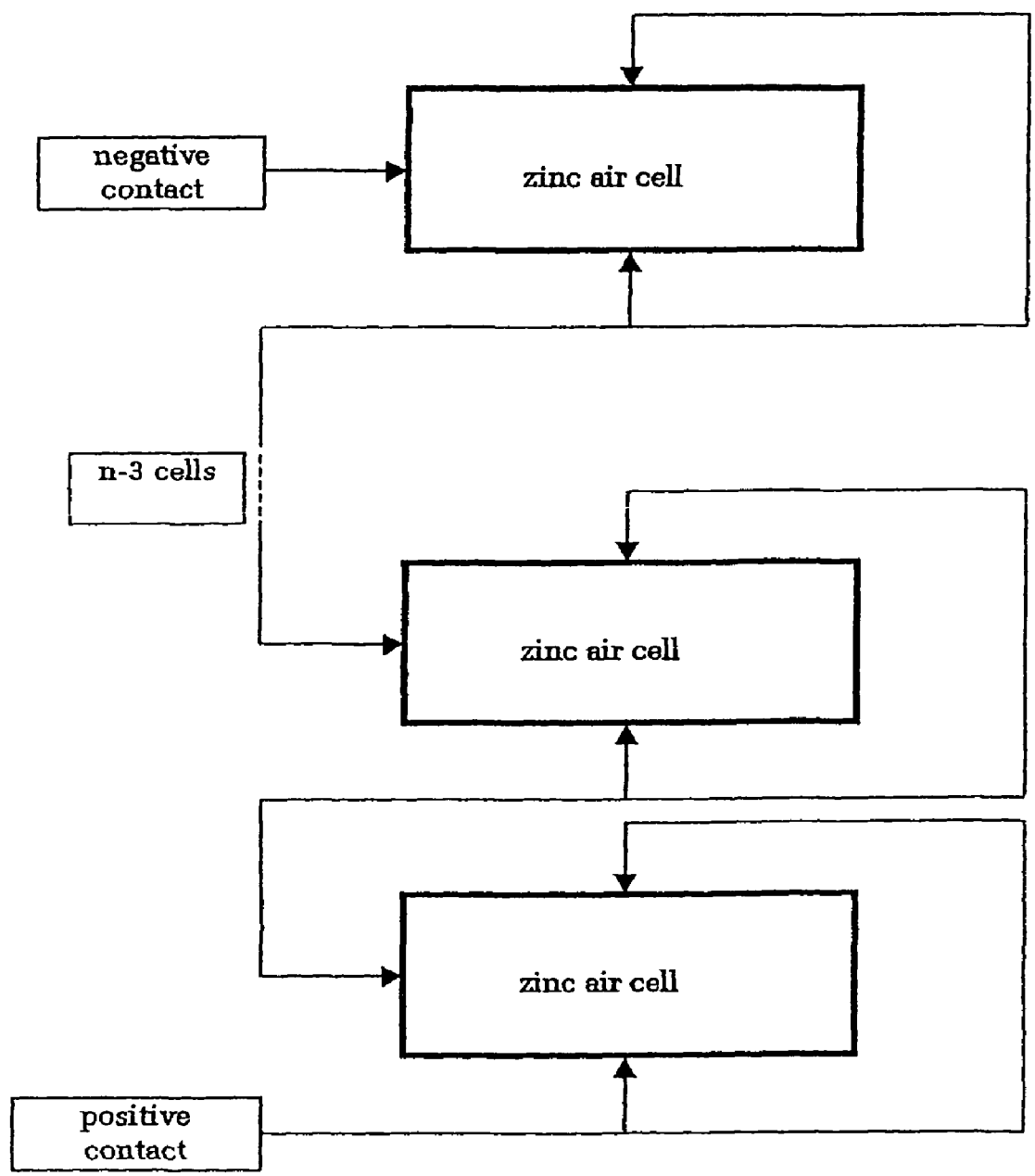

FIG. 4a is a contact schematic for a one-cell embodiment as depicted in relation to the present invention. It is understood that the contacts can either be provided inside the appliance which uses such a zinc/air battery, or it can also be incorporated internal or external of a single cell by suitably applying conductors and insulators so not to short-circuit the cell. For example, an insulated wire or metal band can be electrically connected to either positive contact 54 inside or outside of the cell. Alternatively, the contacts can be part of the appliance, rather than being part of the cell itself. FIGS. 4b and 4c show contact schematics for 2-cell and N-cell extensions of this concept.

Embodiments of the invention such as that shown in FIGS. 2, 3 and 4 are further advantageous in that they may be implemented by making only relatively minor modifications to existing battery manufacturing processes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A metal-air battery comprising:
   first and second cathodes;
   first and second positive contacts electrically connected to the first and second cathodes, respectively;
   an anode;
   first and second separators disposed between the anode and the first and second cathodes, respectively; and
   a negative contact electrically connected to the anode and electrically insulated from the positive contacts, wherein the positive and negative contacts form at least a substantial portion of a casing of the battery, and wherein the casing is configured to allow air into the battery for reduction at the first and second cathodes.

2. The battery of claim 1, wherein the battery is a button battery.

3. The battery of claim 1, wherein the anode comprises zinc.

4. The battery of claim 3, wherein the anode comprises a gelled mixture of zinc powder and potassium hydroxide (KOH) electrolyte.

5. The battery of claim 1, wherein the negative contact forms at least a substantial portion of a lid of the casing, the first positive contact forms at least a substantial portion of a can of the casing, and side portions of the negative contact are disposed within the can.

6. The battery of claim 1, wherein the first positive contact comprises at least one aperture configured to allow air into the battery to provide oxygen for reduction at the first cathode, and the negative contact comprises at least one aperture configured to allow air into the battery to provide oxygen for reduction at the second cathode.

7. The battery of claim 6, further comprising:
   a first air distribution membrane disposed across the at least one aperture of the first positive contact and within the casing; and
   a second air distribution membrane disposed across the at least one aperture of the negative contact and within the casing.

8. The battery of claim 1, wherein the second positive contact is disposed within the battery casing and electrically connects the first and second cathodes, and wherein the second positive contact is electrically insulated from the anode and the negative contact.

9. The battery of claim 1, wherein the negative contact forms a substantially cylindrical portion of the casing, and wherein the first and second positive contacts form first and second lids of the casing disposed proximate first and second ends of the substantially cylindrical portion, respectively.

10. The battery of claim 9, wherein the first positive contact comprises at least one aperture configured to allow air into the battery to provide oxygen for reduction at the first cathode, and the second positive contact comprises at least one aperture configured to allow air into the battery to provide oxygen for reduction at the second cathode.

11. The battery of claim 1, further comprising adhesive tabs configured to seal the battery casing.

12. The battery of claim 1, wherein the first and second separators are configured to prevent migration of solid particles between the anode and the first and second cathodes, respectively.

13. A metal-air battery comprising:
first and second cathodes;
first and second positive contacts electrically connected to the first and second cathodes, respectively;
an anode;
first and second separators disposed between the anode and the first and second cathodes, respectively; and
a negative contact electrically connected to the anode, wherein the positive and negative contacts, together with an insulating gasket, form at least a substantial portion of a casing of the battery, and wherein the casing is configured to allow air into the battery to provide oxygen for reduction at the first and second cathodes.

14. The battery of claim 13, wherein the battery is a button battery.

15. The battery of claim 13, wherein the anode comprises zinc.

16. The battery of claim 15, wherein the anode comprises a gelled mixture of zinc powder and potassium hydroxide (KOH) electrolyte.

17. The battery of claim 13, wherein the negative contact forms at least a substantial portion of a lid of the casing, the first positive contact forms at least a substantial portion of a can of the casing, side portions of the negative contact are disposed within the can, and the first positive contact is electrically insulated from the negative contact by the insulating gasket.

18. The battery of claim 13, wherein the first positive contact comprises at least one aperture configured to allow air into the battery to provide oxygen for reduction at the first cathode, and the negative contact comprises at least one aperture configured to allow air into the battery to provide oxygen for reduction at the second cathode.

19. The battery of claim 18, further comprising:
a first air distribution membrane disposed across the at least one aperture of the first positive contact and within the casing; and
a second air distribution membrane disposed across the at least one aperture of the negative contact and within the casing.

20. The battery of claim 13, wherein the second positive contact is disposed within the battery casing and electrically connects the first and second cathodes, and wherein the second positive contact is electrically insulated from the anode and the negative contact.

21. The battery of claim 13, wherein the negative contact forms a substantially cylindrical portion of the casing, and wherein the first and second positive contacts form first and second lids of the casing disposed proximate first and second ends of the substantially cylindrical portion, respectively.

22. The battery of claim 21, wherein the first positive contact comprises at least one aperture configured to allow air into the battery to provide oxygen for reduction at the first cathode, and the second positive contact comprises at least one aperture configured to allow air into the battery to provide oxygen for reduction at the second cathode.

23. The battery of claim 13, further comprising adhesive tabs configured to seal the battery casing.

24. The battery of claim 13, wherein the first and second separators are configured to prevent migration of solid particles between the anode and the first and second cathodes, respectively.

25. A metal-air battery comprising:
first and second cathodes;
first and second positive contacts electrically connected to the first and second cathodes, respectively;
an anode;
first and second separators disposed between the anode and the first and second cathodes, respectively;
a negative contact electrically connected to the anode and comprising at least one aperture configured to allow air into the battery to provide oxygen for reduction at the second cathode; and
a casing comprising at least a portion of the negative contact and configured to allow air into the battery to provide oxygen for reduction at the first cathode.

26. The battery of claim 25, wherein the battery is a button battery.

27. The battery of claim 25, wherein the anode comprises zinc.

28. The battery of claim 25, wherein the negative contact forms at least a substantial portion of a lid of the casing, the first positive contact forms at least a substantial portion of a can of the casing, and side portions of the negative contact are disposed within the can.

29. The battery of claim 25, wherein the first positive contact comprises at least one aperture configured to allow air into the battery to provide oxygen for reduction at the first cathode, and the negative contact comprises at least one aperture configured to allow air into the battery to provide oxygen for reduction at the second cathode.

30. The battery of claim 29, further comprising:
a first air distribution membrane disposed across the at least one aperture of the first positive contact and within the casing; and
a second air distribution membrane disposed across the at least one aperture of the negative contact and within the casing.

31. The battery of claim 25, wherein the second positive contact is disposed within the battery casing and electrically connects the first and second cathodes, and wherein the second positive contact is electrically insulated from the anode and the negative contact.

32. The battery of claim 25, further comprising adhesive tabs configured to seal the battery casing.

33. The battery of claim 25, wherein the first and second separators are configured to prevent migration of solid particles between the anode and the first and second cathodes, respectively.

* * * * *